J. R. ABBOTT.
Combined Level, Square, Compass and Plumb.
No. 51,675. Patented Dec. 26, 1865.
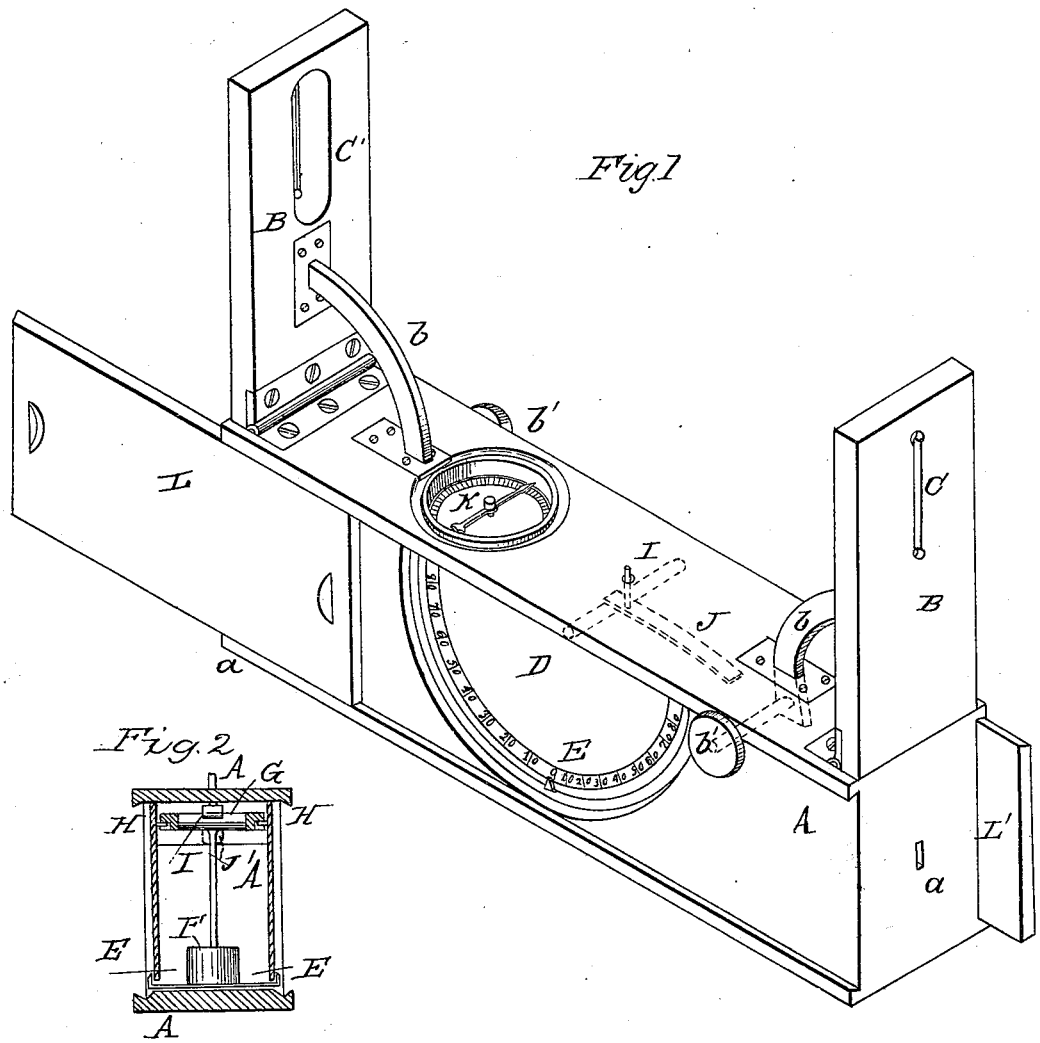

UNITED STATES PATENT OFFICE.

JAMES R. ABBOTT, OF MIDWAY, INDIANA.

IMPROVEMENT IN COMBINED LEVEL, SQUARE, COMPASS, AND PLUMB-STAFF.

Specification forming part of Letters Patent No. 51,675, dated December 26, 1865.

*To all whom it may concern:*

Be it known that I, JAMES R. ABBOTT, of Midway, Spencer county, Indiana, have invented a Combined Level, Square, and Compass; and I do hereby declare the following to be a full, clear, and exact description thereof, reference being had to the accompanying drawings, making part of this specification.

My invention relates to a new and useful instrument which combines the functions of a surveyor's level and compass with those of a carpenter's level, square, and plumb-staff.

Figure 1 is a perspective view of my instrument. Fig. 2 is a transverse section at the mid-length thereof.

A is a block, having the form of a parallelopiped and a semi-cylindrical excavation, A'.

B B' are wings, so hinged to the block A as when extended to form a continuation of the planes of its ends $a$ $a'$. The wings B B' are retained to their rectangular positions or to their closed positions at will by means of segment-bars $b$ and screws $b'$.

C C' are surveyor's sight-holes in the wings B B'.

D D' are graduated semicircular disks or dials.

E are index fingers or hands, attached to a plumb or weight, F, having a cross-head, G, which rests on bee-studs H H'. The position of the hand E on the dial enables the user to know whether the object on which the instrument rests be plumb, or if otherwise to what precise degree of inclination; or, by resting the end $a$ against the side of an object, the operator is enabled to know whether said side be vertical or how far removed therefrom.

I is a stop, which, in the open condition of the instrument, is held clear of the cross-head G by a spring, J, but which, when the wing B is closed down, is thereby pressed upon said head so as to prevent its vibrations, and thus preserve the points of suspension from undue wear when the instrument is not in use.

The top of the block A is recessed to receive a compass, K.

L L' are lids for closing the dials when not in use.

I claim herein as new and of my invention—

The combined level, square, compass, and plumb-staff, substantially as described.

In testimony of which invention I hereunto set my hand.

JAMES R. ABBOTT.

Witnesses:
   JAMES H. LAYMAN,
   ALEXR. A. C. KLAUCKE.